T. E. ADAMS.
DRIVING MECHANISM FOR SPEEDOMETERS.
APPLICATION FILED JUNE 12, 1911.
1,007,625.
Patented Oct. 31, 1911.
2 SHEETS—SHEET 1.
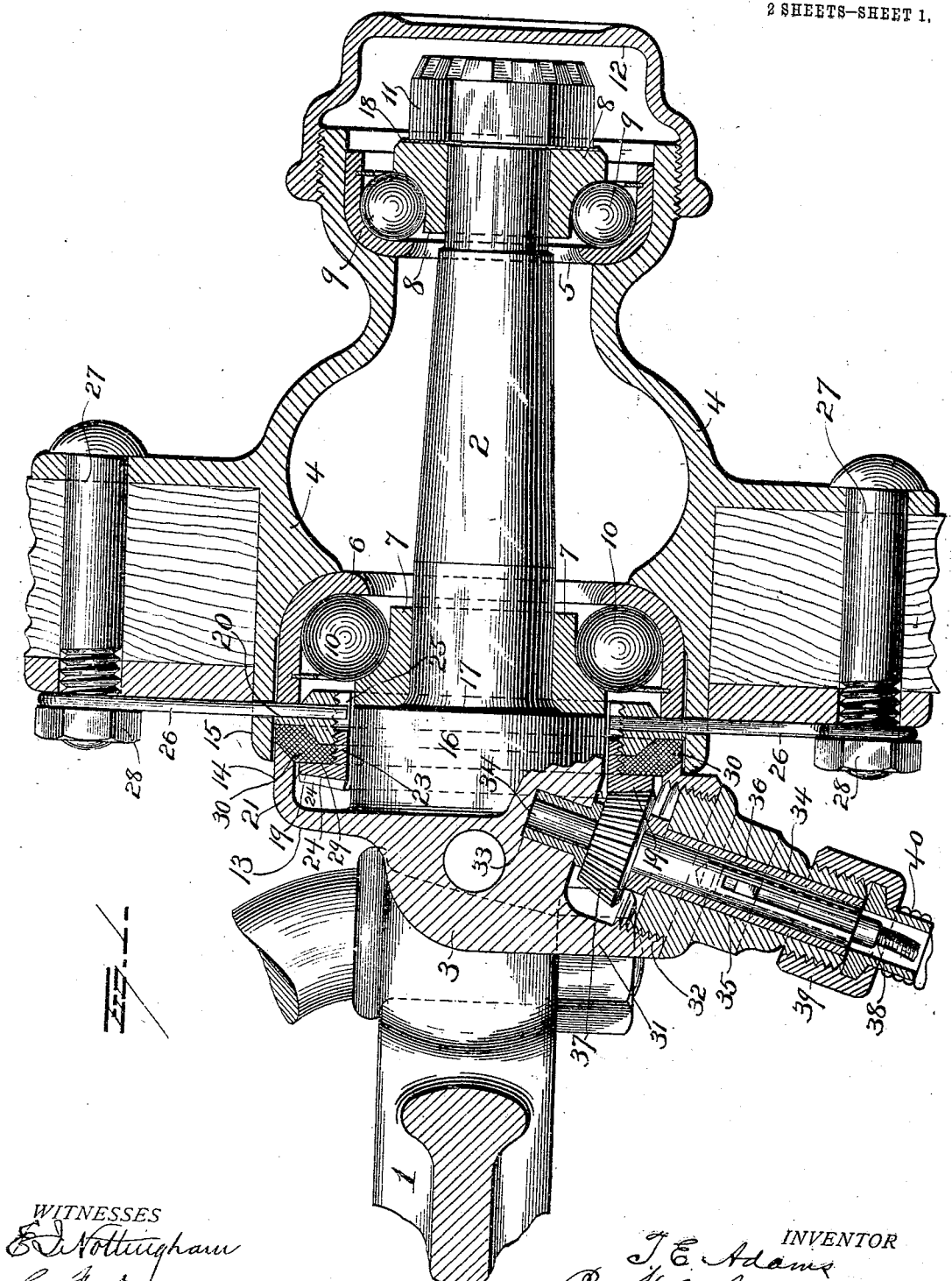
WITNESSES
INVENTOR
Attorney.

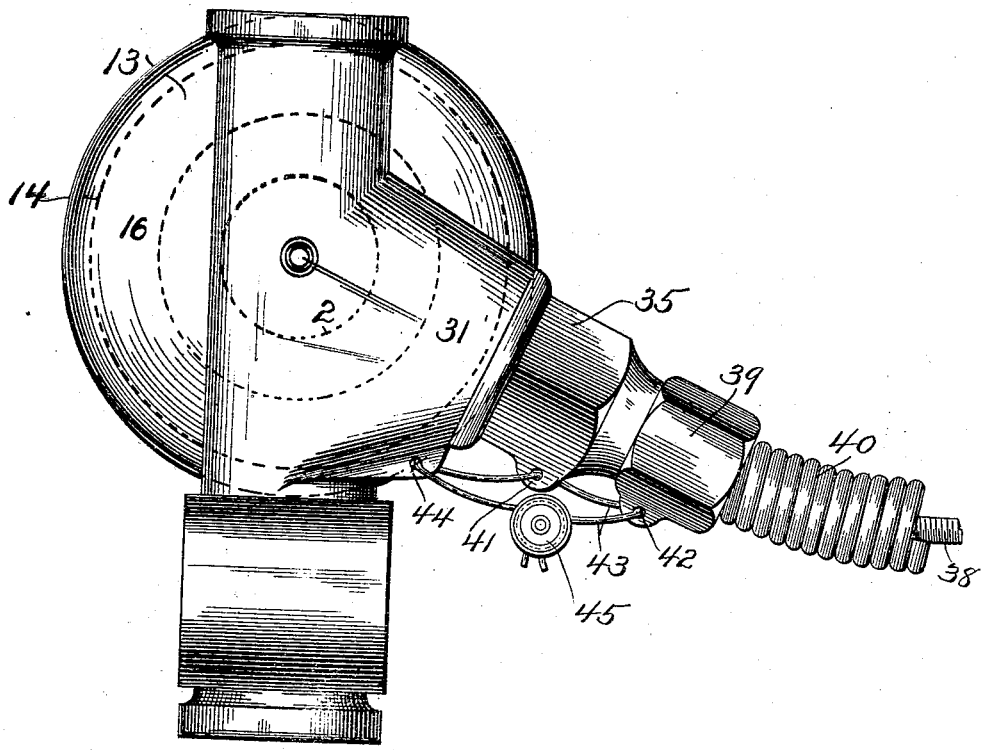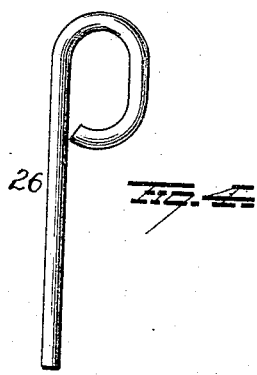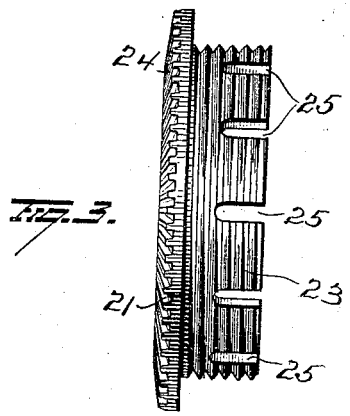

UNITED STATES PATENT OFFICE.

THOMAS EDGAR ADAMS, OF CLEVELAND, OHIO.

DRIVING MECHANISM FOR SPEEDOMETERS.

1,007,625. Specification of Letters Patent. Patented Oct. 31, 1911.

Application filed June 12, 1911. Serial No. 632,648.

*To all whom it may concern:*

Be it known that I, THOMAS E. ADAMS, of Cleveland, in the county of Cuyahoga and State of Ohio, have invented certain new and useful Improvements in Driving Mechanism for Speedometers; and I do hereby declare the following to be a full, clear, and exact description of the invention, such as will enable others skilled in the art to which it appertains to make and use the same.

This invention relates to improvements in driving mechanism for speedometers and more particularly to such as are adapted to receive motion from a wheel of an automobile and transmit such motion to a speedometer located at any convenient place on the vehicle.

One object of my present invention is to provide a simple, compact structure,—the members of which shall be so arranged that the moving parts will be protected from dust and water.

A further object is to so construct the mechanism that gears of one ratio can be readily substituted for gears of another ratio, for giving the proper speed to the driven shaft for carrying-wheels of different diameters.

A further object is to provide simple means for sealing the mechanism and thus prevent falsifying of the record of the speedometer which said mechanism operates.

A further object is to so construct the mechanism that mud and sand cannot be crowded into the joint of the knuckle or between the gear in the hub and the adjacent knuckle member.

A further object is to construct the mechanism in such manner that adjustment in the gearing can be readily effected.

With these objects in view the invention consists in certain novel features of construction and combinations of parts as hereinafter set forth and pointed out in the claims.

In the accompanying drawings, Figure 1 is a sectional view showing a portion of a wheel and its mounting and illustrating the application of my improvements thereto, Fig. 2 is a face view of the knuckle showing the relation of my improvements to the same. Fig. 3 is fragmentary view showing a portion of the ring, and Fig. 4 is a detail view of one of the locking rods.

1 represents a portion of an axle, with which a spindle 2 is connected through the medium of a knuckle 3. The spindle 2 passes through the hub 4 of a wheel and within said hub bearing rings 5—6 are located. Cones 7—8 are placed on the spindle 2 and between these cones and the bearing rings 5—6, anti-friction balls 9—10 are disposed. A suitable nut 11 is screwed on the projecting end of the spindle and between this nut and the cone 8, thin disks or washers 18 are located. The bearing at the point of the spindle and the nut 11 will be inclosed by a dust cap 12 screwed on the outer end of the hub.

The knuckle 3 is provided with a circular enlargement 13 having at its periphery an outwardly projecting annular flange 14 which enters within the projecting sand band 15 of the hub and prevents mud from being crowded into the joint of the knuckle,—said annular flange 14 also serving to protect the packing for a gear ring attached to the hub as presently explained. An integral collar 16 is formed between the enlargement 13 on the knuckle and the inner end of the spindle 2 and affords a shoulder 17. A gear ring 19 encircles the collar 16 and comprises two annular members 20—21, the member 20 being internally threaded and provided with a peripheral portion 22 which enters between the bearing ring 6 and the flanges 14 of the enlargement 13 on the knuckle. The member 21 of the gear ring is made L-shaped in cross-section and its portion 23 is threaded externally to enter the ring-member 20. The outwardly projecting portion of the gear ring member 21 is provided with gear teeth 24. The portion 23 of the gear-ring member 20 is provided with a plurality of notches 25 for the reception of locking rods 26, for holding the gear ring in proper adjustment. I prefer to employ two locking rods provided with loops 26 to engage the projecting ends of bolts 27 and held in place by nuts 28 on said bolts. The rods 26 pass through suitable holes in the gear ring member 20 and enter certain of the notches 25 of the gear-ring member 21, so that when the latter has been properly adjusted with respect to the pinion with which it coöperates, said gear-ring member will be held in such adjustment. With the construction of gear ring above described, it can be readily adjusted for wear, as well as for proper working relation to the pinion which it is to drive.

It will be observed that when the two members of the gear ring shall have been assembled, an annular groove 29 will be formed, and in this groove, felt packing material 30 is located, said material being in sufficient quantity to also enter the space between the forward edge of the flange 14 and the rear edge of the bearing ring 6.

The knuckle 3 is provided with an integral boss 31, said boss being also integral with the circular enlargement 13 and disposed in an inclined position preferably at about 45°. The boss 31 is threaded internally as at 32 and in the upper portion of said boss, a socket is made for the reception of a bushing 33 in which the upper end of a shaft 34 is mounted. A sleeve 35 is screwed into the threaded lower portion of the boss 31 and is provided with a suitable bushing 36 for said shaft 34. A pinion 37 secured to the shaft 34, is so disposed within the boss 31 and between the bushings 33 and 36, as to mesh with the teeth of the gear ring 19 and receive motion from the latter. One end of a flexible shaft 38 is connected with the shaft 34 within the sleeve 35 and this flexible shaft is extended to that part of the vehicle on which the speedometer is located and is suitably connected with the gearing of said speedometer. A cap 39 screwed onto the lower end of the sleeve 35, serves to connect with said sleeve, a flexible housing tube 40,— said housing tube being intended to protect the flexible shaft from the connection of the latter with the shaft 34 to the connection of said flexible shaft with the speedometer.

The sleeve 35 and the cap 39 are made angular on their exterior for the accommodation of a suitable wrench and these angular members are provided with perforated lugs 41—42 respectively for the passage of a wire 43, said wire also passing through a perforation 44 on the knuckle or enlargement 13 thereof. The ends of the wire 43 are connected together by means of a suitable seal 45. With such construction, it is apparent that access to the flexible shaft by which motion is transmitted to the speedometer cannot be had without breaking the seal 45 and removing the cap 39 and the flexible housing tube 40. Malicious falsifying of the speedometer record will by such construction be effectually prevented.

It will be observed that the space formed by the annular flange 14 and the enlargement 13 is appreciably greater than the width or thickness of the gear ring 19 shown in Fig. 1 of the drawing. It is apparent therefore that a wider or thicker gear ring can be substituted for the one shown in the drawing when a smaller pinion 37 is placed on the shaft 34 or a thinner or narrower gear ring can be employed when a larger pinion 31 is used. Thus it will be apparent that the gearing can be readily adjusted in ratio to accommodate wheels of different diameters and thus insure the accurate operation of the speedometer.

In view of the downward inclination of the boss 31 and the devices connected directly therewith, it will be impossible for water and dust to work their way upwardly into the gearing or into the bearing of the gear ring.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In driving mechanism for speedometers, the combination with a wheel hub and an axle spindle, having an enlargement of a gear ring secured to the hub, a circular member carried by the spindle and receiving the gear ring thereinto, a shaft mounted in the enlargement of the spindle, a pinion secured to said shaft and meshing with said gear ring, and a flexible shaft connected with said first mentioned shaft for transmitting motion to a speedometer.

2. In driving mechanism for speedometers, the combination with a wheel hub and an axle spindle mounted therein, said hub provided at its inner end with a sand band, of a gear ring secured to the hub, a circular enlargement rigid with the spindle and having a flange projecting within the sand band of the hub and encircling said gear ring, a boss rigid with the spindle, a shaft mounted in said boss, a pinion secured to said shaft and meshing with the gear ring, and means for transmitting motion from said shaft to a speedometer.

3. The combination with an axle, an axle spindle, a knuckle connecting the axle spindle with the axle, and a hub within which said spindle is mounted, of a gear ring in said hub, a circular enlargement on the knuckle and having a part entering the hub and encircling said gear ring, a boss on said knuckle, a shaft mounted in said boss, a pinion carried by said shaft and meshing with the gear ring, and means for transmitting motion from said shaft to a speedometer.

4. The combination with an axle, a knuckle attached thereto, an axle spindle projecting from said knuckle, and a wheel hub in which said axle spindle is mounted, of a gear ring secured to the hub, a downwardly inclined boss on the knuckle, a shaft mounted in said boss, a sleeve secured to the boss and inclining downwardly therefrom, said sleeve affording a bearing for said shaft, a pinion secured to the shaft and meshing with the gear ring, and means for transmitting motion from said shaft to a speedometer.

5. The combination with a wheel hub and an axle spindle mounted therein, of a gear ring secured to the hub and having a peripheral groove and packing material in said groove, an enlargement rigid with the spindle and provided with an annular flange encircling the grooved periphery of the gear ring and the packing material therein, a shaft having a mounting in the enlargement in the spindle, a pinion secured to said shaft and meshing with the gear ring and means for transmitting motion from said shaft to a speedometer.

6. The combination with a wheel hub and a spindle mounted therein, of a gear ring secured to the hub, an annular enlargement rigid with the spindle and encircling said gear ring so as to inclose the same, a boss rigid with the spindle, a removable sleeve secured to said boss, a shaft mounted in the boss and sleeve, a pinion secured to said shaft and meshing with the gear ring, a flexible shaft connected with the first mentioned shaft, a cap on said sleeve, a flexible housing for the flexible shaft connected with said sleeve, a wire seal connecting said sleeve and cap with each other and with the spindle.

7. The combination with a spindle and a wheel hub, of speedometer driving mechanism, comprising a pinion, a mounting on the spindle for said pinion, and a gear ring secured to the wheel hub, said gear ring comprising two members and means for effecting adjustment of one of said members, relatively to the other and to the pinion.

8. The combination with a spindle and a wheel hub, of speedometer driving mechanism comprising a pinion, a mounting on the spindle for said pinion, a gear ring meshing with said pinion, said gear ring comprising two members movably connected together, and means attached to the wheel hub and engaging the gear ring members to secure said members to the wheel hub and lock them relatively to each other.

9. The combination with a spindle and a wheel hub, of speedometer driving mechanism, comprising a pinion, a mounting on the spindle for said pinion, a gear ring comprising two members, one of said members having gear teeth and having threaded connection with the other member, the gear ring member having the gear teeth being provided with a plurality of slots, and a rod attached to the wheel hub and passing through one gear-ring member and entering a slot in the other gear ring member.

In testimony whereof, I have signed this specification in the presence of two subscribing witnesses.

THOMAS EDGAR ADAMS.

Witnesses:
JOHN R. ORPUTT,
M. C. BIXBY.

Copies of this patent may be obtained for five cents each, by addressing the "Commissioner of Patents, Washington, D. C."